United States Patent Office 3,249,502
Patented May 3, 1966

3,249,502
EMBALMING MATERIAL AND METHOD
Paul R. Hayden, Novato, Calif., assignor to Michel & Pelton Co., Emeryville, Calif., a corporation of California
No Drawing. Filed June 27, 1963, Ser. No. 290,925
19 Claims. (Cl. 167—49.5)

This invention relates to an improved embalming material.

Formaldehyde is the basic active ingredient in most embalming fluids, being used in an aqueous solution, the solution sometimes containing glutaraldehyde, a lower alcohol, or some other materials.

In embalming supplementary treatment by concentrated embalming chemicals is sometimes necessary, the embalming chemicals being applied directly to the tissues of the body by some means other than arterial or hypodermic injection. Conventionally this direct application has been made by applying layers of cotton over the tissues in question and saturating the cotton with the concentrated embalming solution. However, this is a wasteful procedure, because the chemicals are volatile and as they evaporate they are lost to use. Also, the volatile fumes are noxious and disagreeable, so that the procedure is quite unpleasant for the mortician. To avoid this, some embalmers have used a cream containing free formaldehyde but the formaldehyde content of such cream was necessarily low, less than 5%. Moreover, since the cream was not water soluble, it was difficult to remove.

The present invention solves this problem by replacing the embalming solution and the cotton layers with an embalming chemical in gel form. It enables the mortician to perform his operation more conveniently and more effectively. My new embalming gel may be applied in the necessary amount with a brush, with a spatula, or by the fingers. The gel is easily removed by water, yet during use the embalming chemical is held in intimate contact with the body tissues, so it is better able to penetrate them. A very high concentration of the chemicals can be provided, containing pure formalin in gel form, if desired, or more dilute solutions can be used. Moreover, the other chemicals conventionally used and desired by morticians can be incorporated without loss of their strength.

In addition to this use in embalming, my gel may be used wherever a gelled aldehyde is desirable.

Other objects and advantages of the invention will appear from the following description of some preferred embodiments.

I have found that a concentrated formalin gel may be made with the cellulose ethers as the gelling agent. Methyl cellulose, ethyl cellulose, hydroxymethyl cellulose, hydroxyethyl cellulose, and carboxymethyl cellulose are produced in variable degrees of solubility in hot or cold water to provide viscosities ranging from 15 to 15,000 centipoises. Therefore, a great deal of variety may be obtained. The gel may be formulated in different concentrations and in different viscosities to suit the embalming demands and the choice of the mortician. The invention can be practiced by employing a formaldehyde concentration between 5% to 60% formaldehyde by volume. (Since formaldehyde and the gel itself have almost the same density as water, the percentages by weight are substantially the same as those by volume.) A level of about 20% formaydehyde concentration is generally preferred. The gelling agent preferably comprises between 2% and 15% by weight. The invention also contemplates the use of gluteraldehyde in an amount of up to 60% of the formaldehyde content, and it also contemplates, on occasion, the use of alcohol in an amount approximately equal to the concentration of the formaldehyde. The following examples illustrate the invention.

Example I 76 grams of hydroxymethyl cellulose at 4,000 centipoises are added with agitation to 64 ounces of water at a temperature between 80° C. and 90° C. Then 64 ounces of formalin at room temperature are added with agitation and the mixture is cooled. A semisolid gel is obtained having a formaldehyde index of 20. In other words, it is 20% formaldehyde. The gel is stable and can be used in embalming, as described.

Example II

Identical amounts of each of the other four cellulose ethers mentioned, that is, methyl cellulose, ethyl cellulose, hydroxyethyl cellulose, and carboxymethyl cellulose, may individually be substituted for the hydroxymethyl cellulose as Example I, with similar results. Depending upon the viscosity characteristics of the material, the gel will be more or less stiff, and in each instance it is still usable for the purposes mentioned. Different quantities may be used to vary the viscosity further. Whatever cellulose ether is used is used within the range of 2% to 15% of the total weight of the gel.

Example III 64 ounces of pure formalin are heated to between 80 and 90° C., and 38 grams of carboxymethyl cellulose are added. Upon cooling, a smooth, semisolid gel is obtained having a formaldehyde index of 40. With supersaturated formalin, even higher concentrations can be obtained, up to about 60.

Example IV 126 grams of hydroxymethyl cellulose are added with agitation to 64 ounces of warm methyl alcohol. Then 64 ounces of formalin are added with agitation, and the whole is cooled. In this instance gelation is effected more rapidly and the gel is more solid than in Example I. Once again the product has a formaldehyde index of 20. The addition of the alcohol enhances the embalming action of the formaldehyde, and yet both are incorporated into a single solid gel.

Example V

Example IV may be repeated with the other cellulose ethers mentioned above and also with different alcohols. Methyl alcohol is usually preferable, but ethyl alcohol and isopropyl alcohol are also valuable. Any alcohol containing one, two or three carbon atoms can be used.

Example VI 176 grams of hydroxymethyl cellulose are added with agitation to 54 ounces of warm methyl alcohol. After distribution of the cellulose ether, 26 ounces of 25% aqueous solution of glutaraldehyde are added with agitation and then 48 ounces of formalin are added. Once again, a smooth solid gel results having a total aldehyde index of 20, and the gel is stable. It is used in embalming by direct application to the tissues, as stated earlier.

Example VII

In place of the methyl alcohol, ethyl or isopropyl alcohol may be used and in place of the hydroxymethyl cellulose, any of the other four mentioned cellulose ethers may be used, to give a stable gel useful in embalming as before.

In the application of the chemicals of this invention, the gel may be placed on the tissues in slabs, or it may be spread as desired by spatula or by hand and left there until the tissues have absorbed sufficient formaldehyde and the other chemicals, if they are used. A typical time for this is fifteen minutes to one hour. Then the material may be washed off and disposed of as desired.

I claim:

1. A composition usable for embalming, comprising the gelled mixture of formaldehyde, water, and a gelling agent chosen from the group consisting of methyl cellulose, ethyl cellulose, hydroxymethyl cellulose, hydroxyethyl cellulose, and carboxymethyl cellulose.

2. The composition of claim 1 wherein the formaldehyde concentration of the whole lies between 5% to 60% formaldehyde by volume.

3. The composition of claim 1 in which the gelling agent comprises between 2 and 15% by weight.

4. The composition of claim 1 containing, in addition an alcohol having 1 to 3 carbon atoms.

5. The composition of claim 4 in which the alcohol is present in an amount equal to the formaldehyde concentration.

6. The composition of claim 1 in which there is in addition glutaraldehyde in an amount up to 60% of the formaldehyde content.

7. An embalming composition comprising a gelled mixture of formaldehyde, alcohol having 1–3 carbon atoms, glutaraldehyde, water and a gelling agent chosen from the group consisting of methyl cellulose, ethyl cellulose, hydroxymethyl cellulose, hydroxyethyl cellulose, and carboxymethyl cellulose.

8. The composition of claim 7 having the alcohol and formaldehyde in equal concentration, the glutaraldehyde in an amount of 60% of the formaldehyde concentration, and the gelling agent as 2% to 15% by weight of the whole.

9. The composition of claim 8 in which the formaldehyde constitutes 20% of the whole by volume.

10. An embalming method, comprising applying directly to tissues to be embalmed a gelled mixture of formaldehyde, water, and a gelling agent chosen from the group consisting of methyl cellulose, ethyl cellulose, hydroxymethyl celluose, hydroxyethyl cellulose, and carboxymethyl cellulose for time sufficient to embalm the tissues and then washing the gel off.

11. An embalming method comprising applying directly to the tissues to be embalmed, a gelled mixture of formaldehyde, water, and a gelling agent chosen from the group consisting of methyl cellulose, ethyl cellulose, hydroxymethyl cellulose, hydroxyethyl cellulose, and carboxymethyl cellulose.

12. The method of claim 11 wherein the formaldehyde concentration of the whole lies between 5% to 60% formaldehyde by volume.

13. The method of claim 11 in which the gelling agent comprises between 2 and 15% by weight.

14. The method of claim 11 containing, in addition, an alcohol having 1 to 3 carbon atoms.

15. The method of claim 14 in which the alcohol is present in an amount equal to the formaldehyde concentration.

16. The method of claim 11 in which there is in addition glutaraldehyde in an amount up to 60% of the formaldehyde content.

17. An embalming method comprising applying directly to the tissues to be embalmed, a gelled mixture of formaldehyde, alcohol having 1–3 carbon atoms, glutaraldehyde, water, and a gelling agent chosen from the group consisting of methyl cellulose, ethyl cellulose, hydroxymethyl cellulose, hydroxyethyl cellulose, and carboxymethyl cellulose.

18. The method of claim 17 having the alcohol and formaldehyde in equal concentration, the glutaraldehyde in an amount of 60% of the formaldehyde concentration, and the gelling agent as 2% to 15% by weight of the whole.

19. The method of claim 18 in which the formaldehyde constitutes 20% of the whole by volume.

References Cited by the Examiner

UNITED STATES PATENTS

| | | | |
|---|---|---|---|
| 660,756 | 10/1900 | Lebioda | 167—26 |
| 1,265,463 | 5/1918 | McCarthy | 167—26 |
| 1,728,205 | 9/1929 | Hauschka | 167—63 |

OTHER REFERENCES

Cook and Martin: Remington's Practice of Pharmacy, The Mack Publishing Co., Easton, Pa., 1948.

JULIAN S. LEVITT, *Primary Examiner.*

S. J. FRIEDMAN, *Assistant Examiner.*